July 7, 1959
R. H. WENZEL
2,893,055
APPARATUS FOR HEATING PLASTIC MATERIAL IN AN EXTRUDING MACHINE
Filed Aug. 6, 1956
2 Sheets-Sheet 1
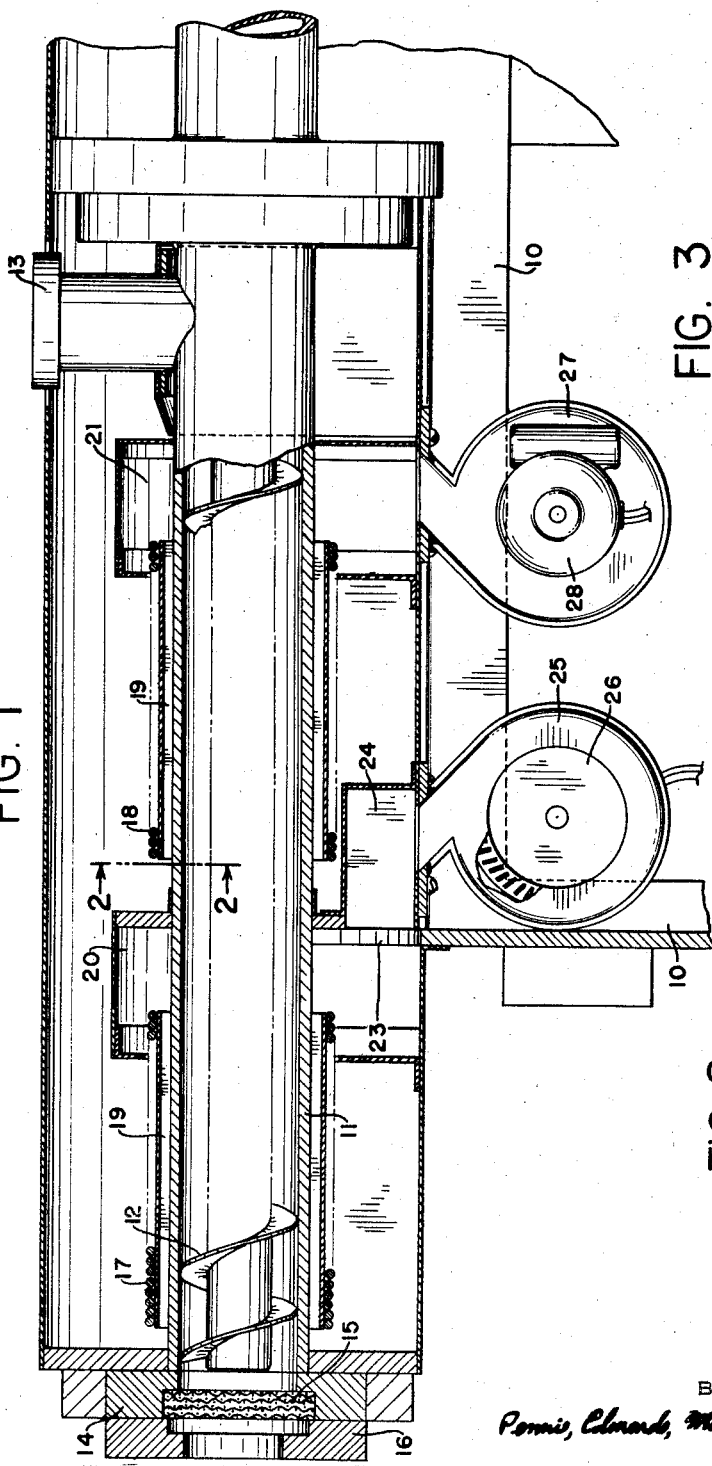
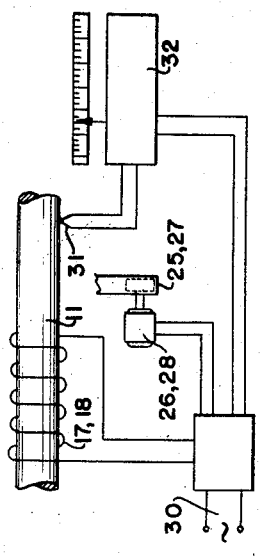
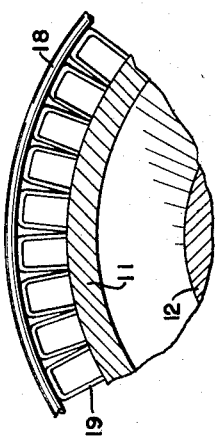
INVENTOR
ROBERT H. WENZEL
BY
*Pennie, Edmonds, Morton, Barrows & Taylor*
ATTORNEYS July 7, 1959  R. H. WENZEL  2,893,055
APPARATUS FOR HEATING PLASTIC MATERIAL IN AN EXTRUDING MACHINE
Filed Aug. 6, 1956  2 Sheets-Sheet 2

INVENTOR
ROBERT H. WENZEL
BY
ATTORNEYS

United States Patent Office 2,893,055
Patented July 7, 1959

2,893,055

APPARATUS FOR HEATING PLASTIC MATERIAL IN AN EXTRUDING MACHINE

Robert H. Wenzel, Temple City, Calif., assignor to Farrel-Birmingham Company Incorporated, Ansonia, Conn., a corporation of Connecticut Application August 6, 1956, Serial No. 602,391

3 Claims. (Cl. 18—12)

The present invention relates to the art of extruding thermoplastic materials, and more particularly to improvements in apparatus for maintaining thermoplastic material at a predetermined temperature during extrusion operations.

In the extrusion of thermoplastic materials it is conventional to employ screw-type extrusion machines, in which a conveying or feeding screw rotates within an elongated barrel to advance plastic material through the barrel and out of a suitable die orifice at one end thereof. During the period in which the plastic material is moved through the extruder barrel, heat is applied to the plastic material, with the intent that by the time the material reaches the extrusion orifice it will be heated to a temperature best suited for carrying out the extruding operation.

Many of the plastic materials which are extruded are of such a nature that the temperature thereof must be rather accurately controlled in order to effectively carry out the extrusion process. Thus, if the material is below a prescribed temperature, it will not be sufficiently plasticized, and the extruded product will be defective. If the temperature is above a prescribed limit, the material will be too soft, and in some cases may be discolored. The range of temperatures within which the plastic materials must be maintained in order to obtain a consistently satisfactory product is relatively narrow and it has been difficult, in the past, to control the apparatus in such manner as to effectively maintain the material in such range.

One of the difficulties encountered in connection with the proper heating of the plastic material is the thermal "flywheel" effect of the apparatus and the slow rate of heat transfer through the material itself. Thus, when heat is applied to the extruder barrel, for example, there is a definite delay before it becomes sufficiently heated to transfer heat into the material. Similarly, after the application of heat is terminated, the parts of the apparatus contain sufficient residual heat to continue the conduction of heat to the plastic material, tending to cause overheating. The problem is further complicated by the fact that the plastic material is generally in constant movement so that substantial quantities of heat must be added to bring the incoming material up to the desired temperature. However, if the extruding apparatus is temporarily stopped, the plastic tends to overheat quickly, since no heat is being carried out by the extrusion of heated material.

The present invention obviates the various problems discussed above by providing improved arrangements for heating the plastic material in a highly stable manner, with a precise and highly responsive control over the temperature of the plastic material. The improved arrangement involves the inductive heating of the extruder barrel with an alternating magnetic flux, so that the walls of the barrel are internally heated in a highly uniform and stable manner.

More specifically, the invention provides a novel arrangement for inductively heating the extruder parts including an induction coil positioned in concentric relation with the extruder barrel and spaced therefrom to provide an annular air passage immediately adjacent the outer surface of the barrel. The construction is of a highly simplified nature, yet is characterized by improved heating ability and precision of control. The spacing of the induction coil from the barrel is productive of important advantages, since the cooling air flows in direct contact with the barrel, and the flow of heat from the barrel to the cooling air does not traverse the heating means, as has been common heretofore. Likewise, in the heating of the barrel, there is no flow of heat through the cooling means. Rather, the annular cooling passage is unaffected by the induction coil, and heat is generated directly within the barrel material.

The apparatus of the invention is equally advantageous for high frequency and low frequency applications. Where commercial 60 cycle, or low frequency power is utilized, the apparatus is modified slightly to incorporate magnetic core means facilitating the flow of heating flux through the extruder barrel. Where high frequency power is utilized, the magnetic core means need not be used. The results are equally satisfactory in both cases.

For a better understanding of the invention, reference may be made to the following detailed description and accompanying drawings, in which:

Fig. 1 is a fragmentary longitudinal section view of the improved apparatus of the invention, as adapted for high frequency operation;

Fig. 2 is a fragmentary cross-sectional view taken along line 2—2 of Fig. 1;

Fig. 3 is a simplified schematic representation of the control arrangements employed in connection with the new apparatus;

Figure 4:
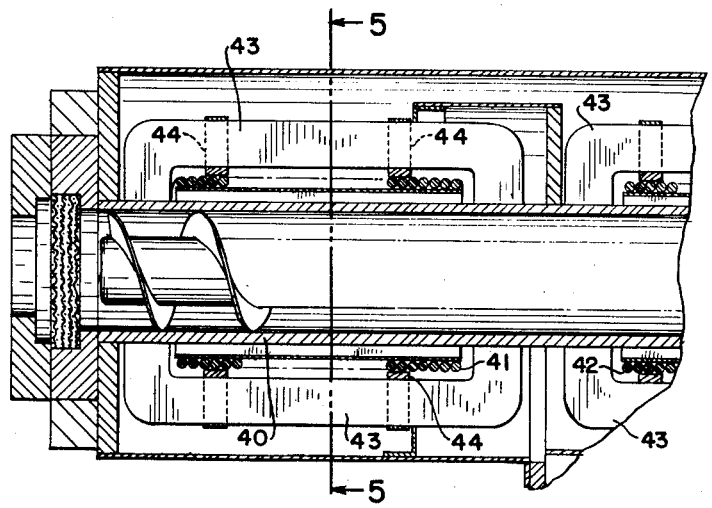
Fig. 4 is a fragmentary longitudinal section view of a modified form of the new apparatus, for use with low frequency power.

Referring now to the drawing, and initially to Figs. 1–3 thereof, the numeral 10 designates the frame structure of a plastic extruding machine. The frame 10 supports an elongated cylinder or barrel 11 which is advantageously formed of steel and has a substantially uniform internal diameter. Within the barrel, and extending throughout substantially the whole of its length, is an elongated screw 12 which is adapted to be rotated with respect to the barrel by suitable drive means (not shown) at the inner or right-hand end of the machine.

Adjacent the inner end of the barrel 11 is a feed pipe 13 which, in the completed machine, receives plastic material in granular or divided form from a suitable hopper, not shown. The feed pipe 13 is in open communication with the interior of the barrel 11 and is adapted to feed the granular plastic material thereinto by gravity flow, in the usual manner.

At the front or forward end of the barrel 11 is a die head 14, in which is received a screen pack 15, consisting of a plurality of fine mesh screens. The screen pack 15 is positioned just beyond the forward end of the screw 12 and covers the opening in the die head 14 leading from the forward end of the barrel. Secured to the die head 14 is a suitable die 16, having an orifice of desired shape and size to form the desired end product. As will be readily understood, the die assembly may include a mandrel, torpedo or other element, for forming hollow articles or coated products.

In a normal extruding operation, the plastic material is fed into the barrel 11, through the feed pipe 13, and is advanced through the barrel at a desired speed by rotation of the screw 12. As the material moves longitudinally through the barrel, it is heated, and is subjected to pressure by the screw. The granular plastic material is thereby formed into a soft homogeneous mass, and in this form is forced through the screen pack 15 and out through the opening in the die 16. The screen pack effects a thorough working of the material before it passes through the die.

In accordance with the invention, a plurality of induction coils 17, 18 are disposed concentrically about the barrel 11 and, collectively, extend over a substantial portion of its length. The coils are of larger diameter than the barrel 11, so that an annular space is provided between the coils and the cylindrical outer surface of the barrel.

To support the coils 17, 18 there are provided a plurality of longitudinally disposed U-shaped channel members 19, placed in side-by-side relation about the surface of the barrel 11, between the latter and the coils 17, 18. As shown in Fig. 2, the channels 19 have their open sides against the outer surface of the barrel and their closed sides disposed outwardly and forming supports. Together, the plurality of channels 19 form a support about which a coil may be supported in concentricity with the barrel 11, substantially in the manner shown.

Each of the channels 19 is open at both ends, as shown in Fig. 1, and forms a longitudinal passage or duct, one side of which is formed by an outer surface portion of the barrel 11. The plurality of channels 19 thus define a like plurality of ducts, entirely surrounding the barrel 11 and forming means for passing cooling air in contact with the outer surface of the barrel about its entire circumference.

In the form of the invention illustrated in Figs. 1 and 2, two induction coils 17 are provided, which extend over different portions of the barrel 11 and are spaced from each other a short distance. Adjacent one end of each of the coils 17 are housings 20 and 21 which entirely surround the barrel 11. The housing 20 is located adjacent an end of the forward coil, and has an opening in its forward wall surrounding the barrel and defining therewith passage means leading into the rearward ends of the channels 19 supporting the forward coil. At the bottom of the housing 20 is an opening 23 leading into a duct 24, which in turn communicates with the outlet of a blower 25. The blower 25 is driven by an electric motor 26.

When the motor 26 is energized, air is forced through the duct 24 into the housing 20 surrounding the barrel 11. The pressurized air in the housing flows into the plurality of ducts formed by the channels 19, the housing 20 serving as a header for the channels, providing for a substantially equal flow of air therethrough.

The housing 21, positioned adjacent the rearward end of the coil 18, is supplied with air by a blower 27, driven by a motor 28, and communicates with the open rearward ends of the channels 19 supporting the coil 18. The blower-driving motor 28 may be selectively energized to cause the flow of air through the spaces between the coil 18 and barrel 11 defined by the channel member 19. Generally, the blower motors 26 and 28 will be energized simultaneously. However, where necessary or desirable the motors may be separately actuated.

In the normal operation of the apparatus of Figs. 1–3, the screw device 12 is rotated to advance plastic material through the interior of the barrel 11. In order to bring the plastic material up to a desired temperature, the coils 17, 18 are energized from a source 30 of high frequency alternating current (Fig. 3), producing a high frequency alternating flux which is passed through the barrel 11.

The continued alternation of flux produced by the coils 17, 18 causes the barrel 11 to be quickly heated internally and with substantial uniformity. The heat from the barrel is then transferred to the plastic material as it is agitated and advanced through the barrel 11 by the screw 12, and eventually the plastic becomes uniformly heated to the desired temperature range, at which it may be most effectively extruded through the die 16.

When the plastic material reaches the desired temperature, a thermocouple 31 or other suitable temperature responsive device actuates a control 32 to de-energize the induction coils 17, 18 and discontinues the generation of heat in the barrel 11 and screw 12. At this time, the blower motors 25, 27 may be actuated to cause cooling air to flow along the outer surface of the barrel. This quickly extracts some of the heat from the barrel, so that overheating of the plastic material due to the thermal "flywheel" effect is avoided. The plastic material will, however, continue to absorb a small amount of residual heat from the barrel and screw for a short period of time, after which the temperature of the material begins to drop, and the thermocouple 31 activates the control device 32 to re-energize the coils 17, 18.

Figure 5:
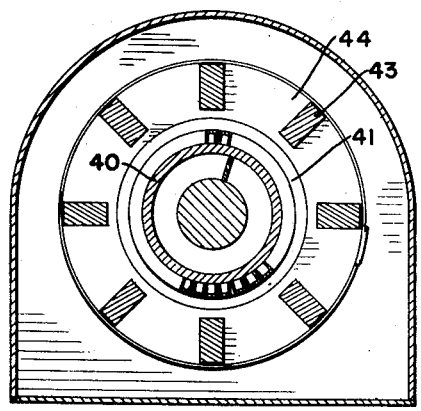
Fig. 5 is a fragmentary cross-sectional view taken along line 5—5 of Fig. 4.

In the form of the apparatus illustrated in Figs. 4 and 5, provisions are made for low frequency energization of the heating coils. In the modified apparatus, the barrel 40 is advantageously formed of magnetic material, and is surrounded by heating coils 41, 42 constructed and arranged in substantially the same manner as in the apparatus of Fig. 1. Adjacent the heating coils 41, 42 are a plurality of radially disposed U-shaped magnetic conductor bars or cores 43 which contact the barrel adjacent the opposite ends of the coils 41, 42 and span the coils lengthwise, substantially as shown in Fig. 4. The cores 43 are supported in insulated relation to the coils 41, 42 by means of insulating elements 44 surrounding the coils at longitudinally spaced points.

In the modified form of the apparatus, the coils 41, 42 are energized from a low frequency power source, such as a commercial 60 cycle power supply. The alternating flux generated by the coils is passed through the barrel 40, causing internal heating thereof in the desired manner. The magnetic core members 43 provide for a materially increased flux level for a given magnetizing force, and therefore increase the efficiency of the apparatus when energized with low frequency power.

Eddy current and hysteresis losses in the cores 43 are minimized by forming the cores of laminated material. This further improves the efficiency of operation of the low frequency heater.

In some cases, it may be desirable to heat the screw as well as the barrel of the extruder, and, to this end, the magnetizing force used may be such as to substantially saturate the barrel and pass into the screw itself. This may be advantageous for certain operations, since the material within the barrel is heated from internal as well as external sources.

Since, with the new apparatus, heat is generated uniformly internally of the barrel, the heating of the plastic is highly stable, and substantially more so than has been possible heretofore, in the absence of costly special control equipment. Where the operation is continuous, the periodic energization of the induction coils 17, 18 and blower motors 25, 27 will cause the plastic material to be heated with substantial uniformity, and will maintain the material within a narrow temperature range, at which the extrusion operation may be carried out with the best results.

If at any time the plastic material tends to overheat, as where the screw device is stopped or suddenly slowed, the thermocouple 31 actuates the control device 32 to energize the blower motors 25, 27, and set up the flow of cooling air between the barrel and coils 17, 18. The air moves in direct contact with the barrel 11, and thus extracts heat therefrom with a maximum efficiency.

One of the most important features of the invention resides in the use of induction coils spaced from the outer surface of the extruder barrel, in combination with means to direct the flow of cooling air through the annular space between the barrel and coils. The arrangement is such that both the heating and cooling means act directly upon the extruder barrel, and neither acts through the other.

As will be readily apparent, the new apparatus is of a simplified nature, providing for economical manufacture and maintenance. Experimental results clearly show, moreover, that the new apparatus provides for more stable operation than has been possible hertofore without complicated control equipment.

It is contemplated, of course, that inductive heating arrangements similar to those herein described may be employed for heating the various parts of the extrusion die, for example.

I claim:

1. In an extruding machine including an elongated barrel for containing thermoplastic material, an extrusion orifice at one end of the barrel, and means within said barrel for advancing said plastic material toward said orifice, an electrically energizable induction coil for heating said barrel, separating members supporting said induction coil in spaced concentric relation to said barrel, said separating means also partly defining a plurality of longitudinal coextensive cooling passages extending completely through the space between said barrel and said coil, air blower means mounted adjacent said barrel, and air duct means including a housing surrounding said barrel adjacent one end of said coil and adapted to direct the flow of air from said blower through said passages between said coil and barrel.

2. Apparatus according to claim 1, further including magnetic core means contacting said barrel and forming return path means for flux induced in said barrel.

3. Apparatus according to claim 1 wherein said separating members comprise a plurality of channels disposed longitudinally in side-by-side relation around the circumference of said barrel, said channels being positioned against said barrel with the edges of their flanges abutting the barrel such that air passing through said channels directly contacts said barrel, said coil being wound around the channel base portions.

References Cited in the file of this patent

UNITED STATES PATENTS

| | | |
|---|---|---|
| 2,226,447 | Smith et al. | Dec. 24, 1940 |
| 2,309,496 | Bird et al. | Jan. 26, 1943 |
| 2,431,095 | Tucker | Nov. 18, 1947 |
| 2,469,028 | Belaieff | May 3, 1949 |
| 2,541,201 | Buecken et al. | Feb. 13, 1951 |
| 2,721,729 | Van Riper | Oct. 25, 1955 |
| 2,774,107 | Davis | Dec. 18, 1956 |